(12) United States Patent
Wang et al.

(10) Patent No.: US 12,341,674 B2
(45) Date of Patent: Jun. 24, 2025

(54) CONTENT DELIVERY NETWORK PROCESSING METHOD AND DEVICE, AND ELECTRONIC DEVICE

(71) Applicant: Beijing Baidu Netcom Science Technology Co., Ltd., Beijing (CN)

(72) Inventors: Xuelian Wang, Beijing (CN); Shaomei Wu, Beijing (CN); Fuwen Liang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 0 days.

(21) Appl. No.: 17/800,849

(22) PCT Filed: Dec. 8, 2021

(86) PCT No.: PCT/CN2021/136408
§ 371 (c)(1),
(2) Date: Aug. 18, 2022

(87) PCT Pub. No.: WO2022/267366
PCT Pub. Date: Dec. 29, 2022

(65) Prior Publication Data
US 2024/0223481 A1    Jul. 4, 2024

(30) Foreign Application Priority Data
Jun. 22, 2021   (CN) .......................... 202110690036.7

(51) Int. Cl.
*H04L 12/26* (2006.01)
*H04L 41/0681* (2022.01)
(Continued)

(52) U.S. Cl.
CPC ...... *H04L 43/0817* (2013.01); *H04L 41/0681* (2013.01); *H04L 43/16* (2013.01)

(58) Field of Classification Search
CPC . H04L 43/0817; H04L 41/0681; H04L 43/16; H04L 67/104; H04L 41/045;
(Continued)

(56) References Cited

U.S. PATENT DOCUMENTS 9,336,483 B1 *   5/2016   Abeysooriya ............ G06N 3/08
9,930,098 B2 *   3/2018   Choquette ........... H04L 43/0811
(Continued)

FOREIGN PATENT DOCUMENTS

CN   107306278 A   10/2017
CN   107769963 A    3/2018
(Continued)

OTHER PUBLICATIONS

English Translation of International Search Report corresponding to International Patent Application No. PCT/CN2021/136408, dated Aug. 12, 2021 (6 pages).
(Continued)

*Primary Examiner* — Phuongchau Ba Nguyen
(74) *Attorney, Agent, or Firm* — Maginot, Moore & Beck LLP (57) ABSTRACT

A content delivery network processing method includes: obtaining response data from at least one CDN node in response to a network request from a detection end, the response data including information indicating that the network request is successful or failed; calculating the quantity of detection successes and the quantity of detection failures of the detection end corresponding to the at least one CDN node in accordance with the response data; calculating a detection failure rate of the detection end in accordance with the quantity of detection successes and the quantity of detection failures; and comparing at least one of the detection failure rate or the quantity of detection failures with a
(Continued)

target threshold, and determining whether the detection end is faulty in accordance with a comparison result.

20 Claims, 3 Drawing Sheets

(51) Int. Cl.
  *H04L 43/0817* (2022.01)
  *H04L 43/16* (2022.01)
(58) Field of Classification Search
  CPC . H04L 67/1097; H04L 69/04; H04L 41/0631; H04L 67/02; H04L 67/60; H04L 45/28; H04L 45/22; H04L 29/14; H04L 45/00; H04L 12/242
  See application file for complete search history.

(56) References Cited

U.S. PATENT DOCUMENTS

| | | | |
|---|---|---|---|
| 10,484,308 B2* | 11/2019 | Liu | H04L 65/612 |
| 10,860,465 B2* | 12/2020 | Elimeleh | G06F 16/00 |
| 2003/0174648 A1* | 9/2003 | Wang | H04L 67/1095 370/235 |
| 2006/0112416 A1* | 5/2006 | Ohta | H04W 8/22 726/1 |
| 2009/0125413 A1* | 5/2009 | Le Chevalier | G06Q 40/12 705/26.1 |
| 2017/0351599 A1 | 12/2017 | Elimeleh et al. | |
| 2018/0026938 A1* | 1/2018 | Xiang | H04L 67/289 709/245 |
| 2018/0219933 A1 | 8/2018 | Choquette et al. | |
| 2020/0099981 A1* | 3/2020 | Zhang | H04N 21/6375 |
| 2020/0382382 A1 | 12/2020 | Wang | |
| 2024/0013601 A1* | 1/2024 | Saleh | G07C 9/22 |

FOREIGN PATENT DOCUMENTS

| | | |
|---|---|---|
| CN | 107894950 A | 4/2018 |
| CN | 109194772 A | 1/2019 |
| CN | 109495319 A | 3/2019 |
| CN | 109597728 A | 4/2019 |
| CN | 110162424 A | 8/2019 |
| CN | 110650069 A | 1/2020 |
| CN | 111585833 A | 8/2020 |
| CN | 112202631 A | 1/2021 |
| CN | 112783792 A | 5/2021 |
| CN | 113438106 A | 9/2021 |
| JP | 2009193486 A | 8/2009 |

OTHER PUBLICATIONS

International Search Report corresponding to International Patent Application No. PCT/CN2021/136408, dated Aug. 12, 2021 (9 pages).
English Translation of Chinese Office Action corresponding to Chinese Patent Application 202110690036.7, dated Jun. 15, 2022. (8 Pages).
Chinese Office Action corresponding to Chinese Patent Application 202110690036.7, dated Jun. 15, 2022. (8 Pages).
English Translation of CN110650069A. (21 Pages).
English Translation of CN112783792A. (29 Pages).
English Translation of CN111585833A. (24 Pages).
English Translation of CN107769963A. (27 Pages).
English Translation of CN107894950A. (31 Pages).
English Translation of CN109597728A. (19 Pages).
English Translation of CN110162424A. (47 Pages).
English Translation of CN113438106A. (30 Pages).
English Translation of CN109495319A. (37 Pages).
English Translation of Japanese Office Action corresponding to Japanese Patent Application 2022-549030, dated Aug. 15, 2023. (4 Pages).
Japanese Office Action corresponding to Japanese Patent Application 2022-549030, dated Aug. 15, 2023. (4 Pages).
Extended European Search Report corresponding to European Patent No. 21925101, dated Jul. 21, 2023. (9 Pages).
English Translation of CN107306278A. (21 Pages).
English Translation of CN109194772A. (20 Pages).
English Translation of CN112202631A. (29 Pages).

* cited by examiner

FIG. 5

CONTENT DELIVERY NETWORK PROCESSING METHOD AND DEVICE, AND ELECTRONIC DEVICE

CROSS-REFERENCE TO RELATED APPLICATION

This application is the U.S. national phase of PCT Application No. PCT/CN2021/136408 filed on Dec. 8, 2021, which claims a priority of the Chinese patent application No. 202110690036.7 filed on Jun. 22, 2021, which are incorporated herein by reference in their entireties.

TECHNICAL FIELD

The present disclosure relates to the field of Internet technology, in particular to a distributed network technology, more particularly to a CDN processing method, a CDN processing device, and an electronic device.

BACKGROUND

Content Delivery Network (CDN) is a smart virtual network established on the basis of an existing network, and through edge servers deployed at different places, a user obtains a desired content nearby using such functional modules of a central platform as load balance, content delivery and scheduling, so it is able to reduce a network congestion level, and improve a response speed and a hit rate of an user access. Currently, the user transmits a hypertext transfer protocol (http) through a third-party platform, so as to detect CDN node resources of various manufacturers, thereby to determine CDN properties of the manufacturers.

SUMMARY

An object of the present disclosure is to provide a CDN processing method, a CDN processing device and an electronic device, so as to solve problems in the related art.

In one aspect, the present disclosure provides in some embodiments a CDN processing method, including: obtaining response data from at least one CDN node in response to a network request from a detection end, the response data including information indicating that the network request is successful or failed; calculating the quantity of detection successes and the quantity of detection failures of the detection end corresponding to the at least one CDN node in accordance with the response data; calculating a detection failure rate of the detection end in accordance with the quantity of detection successes and the quantity of detection failures; and comparing at least one of the detection failure rate or the quantity of detection failures with a target threshold, and determining whether the detection end is faulty in accordance with a comparison result.

In another aspect, the present disclosure provides in some embodiments a CDN processing device, including: an obtaining module configured to obtain response data from at least one CDN node in response to a network request from a detection end, the response data including information indicating that the network request is successful or failed; a first calculation module configured to calculate the quantity of detection successes and the quantity of detection failures of the detection end corresponding to the at least one CDN node in accordance with the response data; a second calculation module configured to calculate a detection failure rate of the detection end in accordance with the quantity of detection successes and the quantity of detection failures; and a determination module configured to compare at least one of the detection failure rate or the quantity of detection failures with a target threshold, and determine whether the detection end is faulty in accordance with a comparison result.

In yet another aspect, the present disclosure provides in some embodiments an electronic device, including at least one processor, and a memory in communication with the at least one processor. The memory is configured to store therein an instruction to be executed by the at least one processor, and the instruction is executed by the at least one processor so as to implement the above-mentioned CDN processing methods.

In still yet another aspect, the present disclosure provides in some embodiments a non-transitory computer-readable storage medium storing therein a computer instruction. The computer instruction is executed by a computer so as to implement the above-mentioned CDN processing methods.

In still yet another aspect, the present disclosure provides in some embodiments a computer program product including a computer program. The computer program is executed by a processor so as to implement the above-mentioned CDN processing methods.

According to the schemes provided in the embodiments of the present disclosure, whether the detection end is faulty is determined, so as to rapidly and effectively determine whether the poor network performance of the CDN node is caused by the faulty detection end or the faulty CDN node, thereby to improve the detection accuracy of the network performance of the CDN node, and enable a maintenance personnel to take a corresponding measure.

It should be understood that, this summary is not intended to identify key features or essential features of the embodiments of the present disclosure, nor is it intended to be used to limit the scope of the present disclosure. Other features of the present disclosure will become more comprehensible with reference to the following description.

BRIEF DESCRIPTION OF THE DRAWINGS

The following drawings are provided to facilitate the understanding of the present disclosure, but shall not be construed as limiting the present disclosure. In these drawings.

DETAILED DESCRIPTION

In the following description, numerous details of the embodiments of the present disclosure, which should be deemed merely as exemplary, are set forth with reference to accompanying drawings to provide a thorough understanding of the embodiments of the present disclosure. Therefore, those skilled in the art will appreciate that modifications or replacements may be made in the described embodiments without departing from the scope and spirit of the present disclosure. Further, for clarity and conciseness, descriptions of known functions and structures are omitted.

The present disclosure provides in some embodiments a CDN processing method.

Figure 1:
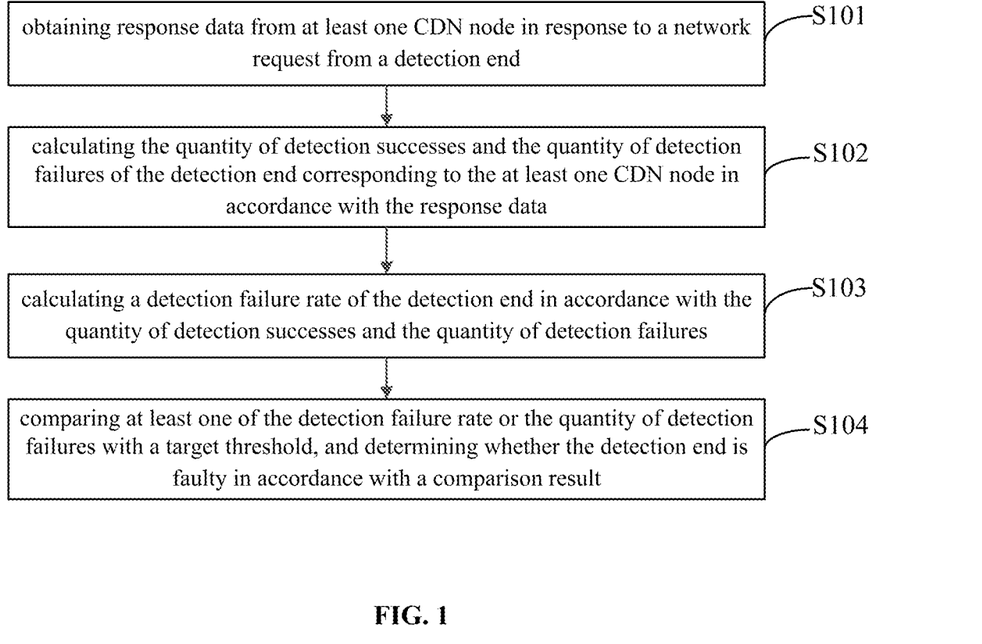
FIG. 1 is a flow chart of a CDN processing method according to one embodiment of the present disclosure.

As shown in FIG. 1, which is a flow chart of the CDN processing method according to one embodiment of the present disclosure, the CDN processing method includes the following steps.

Step S101: obtaining response data from at least one CDN node in response to a network request from a detection end.

The response data includes information indicating that the network request is successful or failed.

It should be appreciated that, the method in the embodiments of the present disclosure is applied to an electronic device such as mobile phone or computer, and the electronic device is equipped with a third-party detection system. The third-party detection system is used to simulate such a situation where a plurality of network request end transmits the network request to a target network, e.g., transmits a video obtaining request to a video website, or transmits a search request to a search website. It should be appreciated that, upon the reception of the network request, the target network transmits a feedback to the network request end via an edge server deployed at any place, and the CDN is a distributed network consisting of the edge servers at different regions.

In a possible embodiment of the present disclosure, the at least one CDN node refers to CDN nodes manufactured by different manufacturers for providing a CDN service. When there are five CDN nodes, these five CDN nodes are provided by five manufacturers respectively, for example.

In the embodiments of the present disclosure, the electronic device transmits, through N detection ends, the network request to the target network through the third-party detection system. For example, the electronic device transmits a http request to the target network in accordance with a predetermined frequency and a predetermined parameter, so as to obtain the response data returned by the target network through the at least one CDN node. The response data includes the information indicating that the network request is successful or failed. For example, the response data includes a field ErroID. When a numerical value of this field is 0, it means that the network request is successfully, and when the numerical value of this field is 1, it means that the network request is unsuccessful (fails). The detection end refers to a virtual node in the third-party detection system for simulating a request end, e.g., a preset program. The network request is transmitted through the detection end, so as to detect the CDN node resources from each manufacturer or the CDN network performance.

Step S102: calculating the quantity of detection successes and the quantity of detection failures of the detection end corresponding to the at least one CDN node in accordance with the response data.

It should be appreciated that, the electronic device, through simulating the detection end in the third-party detection system, transmits the network request to the target network. Upon the receipt of the network request, the target network transmits the response data in response to the network request through the CDN nodes from different manufacturers, i.e., no matter whether the network request is successful or failed, the target network may respond to the request from the detection end in response to the response data. At this time, the electronic device obtains the quantity of request successes and the quantity of request failures in accordance with the received response data.

In this step, upon the receipt of the response data from the CDN node, the electronic device calculates the quantity of detection successes and the quantity of detection failures of the at least one CDN node detected by any detection end in accordance with request success information and request failure information in the response data.

For example, the quantity of CDN nodes is five, the quantity of detection ends is three, and the electronic device simulates the request end through the three detection ends to transmit the network request and then obtains the response data returned by the five CDN nodes with respect to the network request transmitted by each detection end. When the detection end is a first detection end and the response data returned by the five CDN nodes with respect to a network request from the first detection end indicates that the request is successful, the quantity of detection successes of the first detection end corresponding to the network request is five, and the quantity of detection failures is zero. In this way, it is able to calculate the quantity of detection successes and the quantity of detection failures of each detection end in accordance with the response data from the CDN node, thereby to calculate the total quantity of detection successes and the total quantity of detection failures of all the detection ends.

It should be appreciated that, the detection end transits the network request to the target network in accordance with a predetermined frequency and a predetermined parameter, e.g., the detection end transmits one network request every three seconds. The electronic device obtains the response data returned by the at least one CDN node with respect to each network request, i.e., determines the CDN nodes in the at least one CDN node for which the network request is successful and the CDN nodes for which the network request is unsuccessful (fails). For a same detection end, the electronic device obtains the response data returned by the at least one CDN node with respect to each network request in all the network requests from the detection end.

Step S103: calculating a detection failure rate of the detection end in accordance with the quantity of detection successes and the quantity of detection failures.

It should be appreciated that, in the embodiments of the present disclosure, in the case that the quantity of detection end is greater than 1, the quantity of detection successes and the quantity of detection failures refer to the quantity of detection successes and the quantity of detection failures of any detection end. In this case, the detection failure rate of the detection end is calculated in accordance with the quantity of detection successes and the quantity of detection failures of the detection end corresponding to the at least one CDN node. For example, the quantity of detection successes corresponding to the first detection end is 7 and the quantity of detection failures is 3, the detection failure rate of the first detection end is $3/(7+3)=0.3$.

Alternatively, in the case that the quantity of detection ends is greater than 1, the quantity of detection successes and the quantity of detection failures refer to the quantity of detection successes and the quantity of detection failures of all the detection ends with respect to a certain network request. For example, when the quantity of detection ends is 3, the quantity of detection successes and the quantity of detection failures of a first detection end with respect to a certain network request are 7 and 3 respectively, the quantity of detection successes and the quantity of detection failures of a second detection end with respect to the network request are 6 and 4 respectively, and the quantity of detection successes and the quantity of detection failures of a third detection end with respect to the network request are 5 and 5, the quantity of detection successes and the quantity of detection failures of all the detection ends with respect to the network request are 18 and 12, and the detection failure rate is 0.4.

Alternatively, in the case that the quantity of detection ends is greater than 1, the quantity of detection successes and the quantity of detection failures further refer to the quantity of detection successes and the quantity of detection failures of any detection end with respect to all the network requests. For example, when the detection end is a first detection end which has transmitted 3 network requests, the quantity of detection successes and the quantity of detection failures with respect to a first network request are 7 and 3 respectively, the quantity of detection successes and the quantity of detection failures with respect to a second network request are 8 and 2 respectively, and the quantity of detection successes and the quantity of detection failures with respect to a third network request are 5 and 5, the quantity of detection successes and the quantity of detection failures of the first detection end are 20 and 10, and the detection failure rate is 0.33.

Step S104: comparing at least one of the detection failure rate or the quantity of detection failures with a target threshold, and determining whether the detection end is faulty in accordance with a comparison result.

In the embodiments of the present disclosure, after the detection failure rate and the quantity of detection failures of the detection end has been obtained, at least one of the detection failure rate or the quantity of detection failures is compared with the target threshold, and then whether the target detection end is faulty is determined in accordance with the comparison result.

For example, when the detection failure rate of a certain detection end is 0.3 and the target threshold is 0.2, i.e., the detection failure rate is greater than the target threshold, it is determined that the detection end is faulty; and when the detection failure rate of the detection end is 0.1 which is smaller than the target threshold, it is determined that the detection end is not faulty.

Alternatively, the detection failure rate also refers to a total detection failure rate of all the detection ends. When the total detection failure rate is greater than a first threshold, it is determined that the detection end is faulty. Then, the detection failure rate of each detection end is further obtained and compared with a second threshold. When the detection failure rate of the detection end is greater than the second threshold, it is determined that the detection end is faulty.

In a possible embodiment of the present disclosure, the quantity of detection failures of the detection end is also compared with the target threshold, so as to determine whether the target detection end is faulty. Alternatively, both the detection failure rate and the quantity of detection failures are compared with the target threshold, so as to determine whether the target detection end is faulty. Feasible determination modes will be illustratively described hereinafter, and thus will not be particularly defined herein.

According to the embodiments of the present disclosure, the response data from the at least one CDN node is obtained in response to the network request from the detection end. Next, the quantity of detection successes and the quantity of detection failures of the detection end are calculated in accordance with the response data. Next, the detection failure rate of the detection end is calculated in accordance with the quantity of detection successes and the quantity of detection failures. Then, at least one of the detection failure rate or the quantity of detection failures is compared with the target threshold, and whether the detection end is faulty is determined in accordance with the comparison result. When the network performance of the CDN node detected by the detection end is poor, it is able to determine whether the detection end, and rapidly and effectively determine whether the poor network performance of the CDN node is caused by the faulty detection end or the faulty CDN node, thereby to improve the detection accuracy of the network performance of the CDN node, and enable a maintenance personnel to take a corresponding measure.

In a possible embodiment of the present disclosure, the quantity of detection ends is N, N is an integer greater than 1, the detection failure rate is a detection failure rate corresponding to a target detection end, and the target detection end is any of the N detection ends. Step S104 includes: obtaining a detection failure rate of the target detection end corresponding to each CDN node in the at least one CDN nodes, each detection end in the N detection ends being configured to transmit a predetermined quantity of network requests, each network request corresponding to respond data transmitted by the at least one CDN node; obtaining a minimum failure rate in the detection failure rates corresponding to the at least one CDN node; and in the case that the minimum failure rate is greater than a first target threshold, determining that the target detection end is faulty.

In the embodiments of the present disclosure, each detection end transmits, through simulating the request end, the predetermined quantity of network requests to the target network in accordance with the predetermined frequency, and obtains the response data returned by each CDN node in the at least one CDN node with respect to the predetermined quantity of network requests. The response data includes request success information or request failure information.

For example, the quantity of detection ends is 3, the quantity of CDN nodes is 4, and each detection end in the detection ends transmits the predetermined quantity of network requests, e.g., 5 network requests, to the target network in accordance with the predetermined frequency. With respect to one detection end (or the target detection end), the 4 CDN nodes respond to the 5 network requests from the detection end and transmit the response data, and the response data includes information indicating whether the network request is successful or unsuccessful (fails). For example, when a first CDN node responds to 2 network requests in the 5 network requests successfully but responds to the other 3 network requests unsuccessfully, the quantity of detection successes of the CDN node is 2, the quantity of detection failures is 3, and the detection failure rate is 0.6. Similarly, the quantity of detection successes of a second CDN node is 3, the quantity of detection failures is 2 and the detection failure rate is 0.4; the quantity of detection successes of a third CDN node is 4, the quantity of detection failures is 1 and the detection failure rate is 0.2; and the quantity of detection successes of a fourth CDN node is 3, the quantity of detection failures is 2 and the detection failure rate is 0.4. In this way, the detection failure rate of the target detection end with respect to each CDN node in the 4 CDN nodes is calculated. Then, the minimum detection failure rate, e.g., 0.2, is selected from the detection failure rates.

Further, the minimum detection failure rate is compared with the first target threshold. When the minimum detection failure rate is greater than the first target threshold, it means that the detection failure rate of the detection end with respect to each CDN node is greater than the first target threshold, i.e., the detection failure rate of the target detection end is relatively high, and thereby the target detection end is determined to be faulty.

In this way, the detection failure rate of the target detection end with respect to each CDN node in the at least one CDN node is obtained, and the minimum detection failure rate in the detection failure rates is compared with the first target threshold, so as to determine whether the target detection end is faulty. As a result, it is able to rapidly and effectively determine whether the poor CDN network performance is caused by the faulty detection end, thereby to improve the detection accuracy of the network performance of the CDN node.

In a possible embodiment of the present disclosure, the quantity of detection failures corresponding to the target detection end is a target quantity of detection failures. The CDN processing method further includes: in the case that the minimum failure rate is smaller than or equal to the first target threshold, obtaining a total quantity of detection failures of the N detection ends corresponding to the at least one CDN node in accordance with the response data; obtaining a first ratio of the target quantity of detection failures to the total quantity of detection failures; in the case that the first ratio is greater than a second target threshold, obtaining a target detection failure rate corresponding to a target CDN node, the target CDN node being any of the at least one CDN node; and in the case that the target detection failure rate is greater than a third target threshold, determining that the target detection end is faulty.

In the embodiments of the present disclosure, when the minimum failure rate in the detection failure rates of the target detection end corresponding to the CDN nodes is smaller than or equal to the first target threshold, it is insufficient to determine whether the target detection end is faulty.

Further, the total quantity of detection failures of all the detection ends is obtained in accordance with the response data from the at least one CDN node, and then a ratio of the target quantity of detection failures of the target detection end to the total quantity of detection failures of all the detection ends is calculated. For example, presumed that the quantity of network requests is 1, the quantity of detection ends is 3 and the quantity of CDN nodes is 4, when the target quantity of detection failures of a certain detection end (i.e., the target detection end) is 3 and the total quantity of detection failures of the detection ends is 6, a ratio of the quantity of detection failures of the target detection end to the total quantity of detection failures of all the detection ends is 0.5, i.e., the first ratio is 0.5.

Further, the first ratio is compared with the second target threshold. When the first ratio is greater than the second target threshold, it means that the detection failures occur for the target detection end. When the first ratio is smaller than or equal to the second target threshold, it means that the detection failures occur for various detection ends, and at this time it is impossible to determine that the target detection end is faulty.

When the first ratio is greater than the second target threshold, the target detection failure rate corresponding to the target CDN node is further obtained from the detection failure rates of the target detection end corresponding to the at least one CDN node. For example, when the quantity of CDN nodes is 4 and the quantity of network requests transmitted by the target detection end is 5, the target detection failure rate, e.g., 0.4, of the target detection end corresponding to a certain CDN node (i.e., the target CDN node) is obtained. Then, the target detection failure rate is compared with the third target threshold, so as to determine whether the target detection end is faulty. In a possible embodiment of the present disclosure, when the target detection rate is greater than the third target threshold, it is able to determine that the target detection end is faulty, and when the target detection failure rate is smaller than or equal to the third target threshold, it is impossible to determined that the target detection end is faulty.

In this way, when the minimum failure rate in the detection failure rates corresponding to the CDN nodes is smaller than or equal to the first target threshold, the ratio of the quantity of detection failures of the target detection end to the total quantity of detection failures of all the detection ends is compared with the second target threshold, so as to determine whether the detection failures only occur for the target detection end. When the ratio is greater than the second target threshold, the target detection failure rate corresponding to the target CDN node is compared with the third target threshold, so as to determine whether the target detection end is faulty. As a result, through the plurality of target thresholds, it is able to further determine whether the detection end is faulty in a more accurate manner.

In a possible embodiment of the present disclosure, through comparing at least one of the detection failure rate or the quantity of detection failures with the target threshold, it is able to determine whether the detection end is faulty. In the embodiments of the present disclosure, subsequent to Step S104, the CDN processing method further includes, in the case that the detection end is determined to be faulty in accordance with the comparison result, discarding or repairing the faulty detection end.

It should be appreciated that, when determining that the detection end is faulty in accordance with the comparison result, the faulty detection end is discarded or repaired. For example, when the target detection end is faulty in accordance with the comparison result, the target detection end is discarded, i.e., the target detection end does not transmit the network request subsequently so as to prevent the detection of the performance of the CDN node from being adversely affected by the faulty target detection end. Alternatively, the target detection end is repaired, e.g., repaired manually to determine a failure cause, so as to repair the target detection end. When the target detection end has been repaired successfully, it is used normally, and when the target detection end has been repaired unsuccessfully, it is discarded, so as to prevent the detection of the performance of the CDN node from being adversely affected and prevent the occurrence of any misjudgment.

In the embodiments of the present disclosure, through discarding or repairing the faulty detection end, it is able to prevent the detection of the performance of the CDN node from being adversely affected by the faulty detection end, thereby to prevent the occurrence of any detection error.

In the embodiments of the present disclosure, whether the detection end is faulty needs to be determined on the basis of the first target threshold, the second target threshold and the third target threshold, so the determination is affected by values of the three target thresholds. Further, in the embodiments of the present disclosure, the three target thresholds may be further adjusted, i.e., updated, adaptively.

In a possible embodiment of the present disclosure, prior to determining that the target detection end is faulty in the case that the target detection failure rate is greater than the third target threshold, the CDN processing method further includes, in the case that the target detection end is not faulty through a predetermined detection method, updating the third target threshold or the first target threshold. The updated third target threshold is compared with the target detection failure rate subsequently, and the updated first target threshold is compared with the minimum failure rate subsequently.

The predetermined detection method refers to manual double-check detection, or detection through specific instrument, or detection through a self-checking program of the detection end. For example, when the target detection end is faulty as determined mentioned hereinabove, e.g., through comparing the target detection failure rate with the third target threshold, the target detection end is subjected to manual double-check detection so as to determine whether the target detection end is really faulty. When the target detection end is not faulty after the manual double-check detection, it means that there is an error in the above-mentioned determination mode, i.e., a value of the third target threshold is inappropriate, and at this time, the value of the third target threshold is adjusted, so as to obtain the updated third target threshold. In this case, the third target threshold may be considered to be too small, so it is increased, e.g., through adding the third target threshold with a predetermined error, so as to obtain the updated third target threshold.

Further, after updating the third target threshold, the target detection failure rate is compared with the updated third target threshold subsequently, so as to determine whether the target detection end is faulty. In this way, whether the detection end is faulty is determined through double check detection using the predetermined method, so it is able to update the third target threshold in time in the case of a determination error, thereby to reduce a determination error rate subsequently.

It should be appreciated that, a determination result of the target detection end is also obtained through comparing the minimum failure rate with the first target threshold. For example, the target detection end is determined to be faulty through comparing the minimum failure rate with the first target threshold. When the target detection end is not faulty after the manual double check detection, it means that there is an error in the above-mentioned determination mode. A value of the first target threshold may be considered to be inappropriate, so it is necessary to uprate the first target threshold. The updated first target threshold is compared with the minimum failure rate subsequently, so as to reduce the determination error rate of the detection end.

In this way, in the case that the target detection end is determined to be faulty in the above-mentioned determination mode, whether the target detection end is faulty is determined through the predetermined detection method, so as to further improve the determination accuracy of the detection end. In addition, in the case that the target detection end is not faulty through the predetermined detection method, it means that there is an error for the determination mode using the third target threshold or the first target threshold. At this time, the third target threshold or the first target threshold is updated, so as to improve the determination accuracy of the detection end, and reduce the determination error rate.

Alternatively, the first target threshold is updated in accordance with the minimum failure rate. In a possible embodiment of the present disclosure, subsequent to obtaining the first ratio of the target quantity of detection failures to the total quantity of detection failures, the CDN processing method further includes, in the case that the target detection end is not faulty through a predetermined detection method, updating the first target threshold. The updated first target threshold is compared with the minimum failure rate subsequently.

In the embodiments of the present disclosure, the detection failure rate of the target detection end corresponding to each CDN node is obtained, and then the minimum failure rate in the detection failure rats is compared with the first target threshold. When the minimum failure rate is greater than the first target threshold, the target detection end is determined to be faulty. Further, when the target detection end is not faulty through the predetermined detection method, it means that there is an error for the determination mode where the minimum failure rate is compared with the first target threshold. At this time, a value of the first target threshold may be inappropriate, so the first target threshold is updated. In this case, the first target threshold is considered to be too small, so it is necessary to increase the first target threshold, e.g., a predetermined error is added to the first target threshold, so as to obtain the updated first target threshold.

Further, after updating the first target threshold, the minimum failure rate is compared with the updated first target threshold subsequently so as to determine whether the target detection end is faulty. In this way, whether the target detection end is faulty is determined through the predetermined method, so it is able to update the first target threshold in time in the case of a determination error, thereby to ensure the detection accuracy of the detection end.

In a possible embodiment of the present disclosure, subsequent to obtaining the first ratio of the target quantity of detection failures to the total quantity of detection failures, the CDN processing method further includes, in the case that the first ratio is smaller than or equal to the second target threshold and the target detection end is faulty through a predetermined detection method, updating the second target threshold, wherein the updated second target threshold is compared with the first ratio subsequently.

In the embodiments of the present disclosure, after obtaining the first ratio of the target quantity of detection failures corresponding to the target detection end to the total quantity of detection failures corresponding to all the detection ends, when the first ratio is smaller than or equal to the second target threshold, the target detection end is determined to be not faulty. When the target detection end is faulty through the predetermined method, it means that there is an error for the detection mode where the second target threshold is compared with the first ratio. At this time, a value of the second target threshold is inappropriate, and the second target threshold is updated. The updated second target threshold is compared with the first ratio subsequently, so as to reduce the determination error rate of the detection end.

In the embodiments of the present disclosure, in the case of determining whether the detection end is faulty through comparing each parameter with the target threshold, the double check detection is further performed on the detection end through the predetermined method, so as to improve the detection accuracy of the detection end. In addition, it is also able to determine whether the value of the target threshold is appropriate, and in the case that the value of the target threshold is inappropriate, the target threshold is updated in time for the subsequent processing. In this way, it is able to reduce the determination error rate of the detection end, and ensure the detection accuracy of the detection end.

Figure 2:
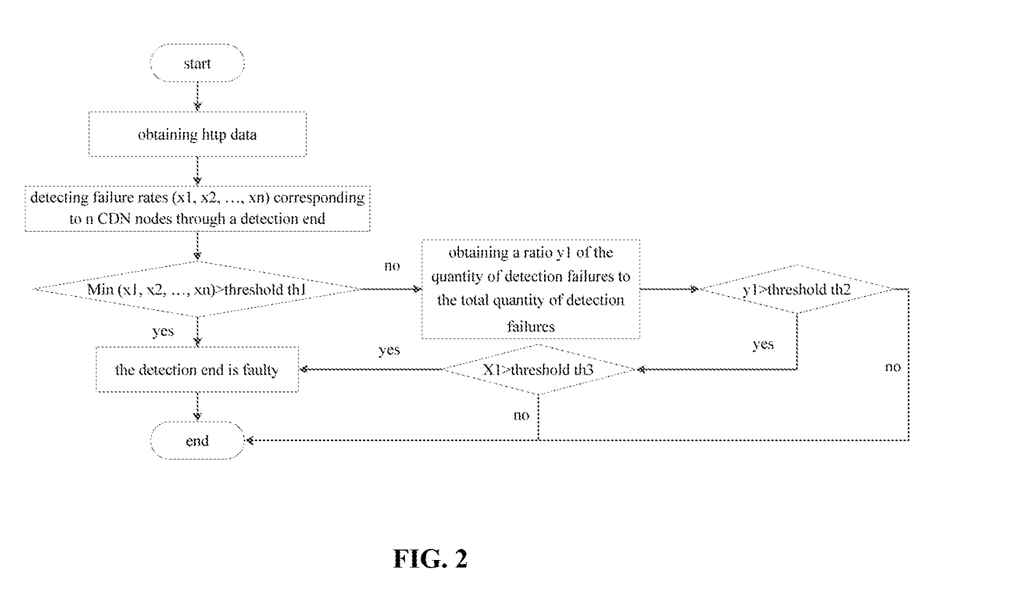
FIG. 2 is another flow chart of the CDN processing method according to one embodiment of the present disclosure.

FIG. 2 is another flow chart of the CDN processing method according to one embodiment of the present disclosure, and the CDN processing method is applied to an electronic device. As shown in FIG. 2, the CDN processing method includes the following steps. The electronic device obtains http data, and transmits the network request in accordance with the obtained http data, so as to detect failure rates (x1, x2, . . . , xn) corresponding to n number of CDN nodes from different manufacturers through the detection end. The detection failure rate is calculated as mentioned in the method embodiments in FIG. 1, which will thus not be particularly defined herein. Next, whether the minimum failure rate in the failure rates corresponding to the n CDN nodes is greater than a threshold th1, i.e., whether Min (x1, x2, . . . , xn) is greater than the threshold th1, is determined. If yes, the detection end is determined to be faulty. If not, a ratio y1 of the quantity of detection failures of the target detection end to the total quantity of detection failures of all the detection ends is obtained, and then whether y1 is greater than a threshold th2 is determined. If not, it is impossible to determine whether the detection end is faulty. If yes, whether the failure rate x1 corresponding to the target CDN node is greater than a threshold th3 is determined. If yes, the detection end is determined to be faulty, and if not, it is impossible to determine whether the detection end is faulty.

It should be appreciated that, in the embodiments of the present disclosure, the calculation of such parameters as the failure rate and the quantity of detection failures as well as the specific determination modes may refer to those mentioned hereinabove with a same or similar technical effect, and thus will not be particularly defined herein.

Figure 3:
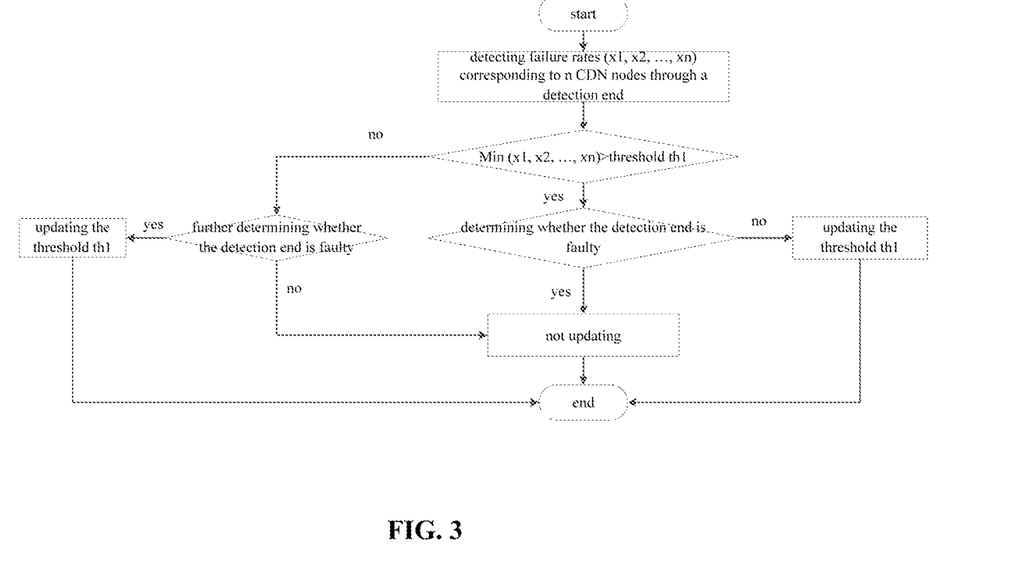
FIG. 3 is yet another flow chart of the CDN processing method according to one embodiment of the present disclosure.

FIG. 3 is yet another flow chart of the CDN processing method according to one embodiment of the present disclosure, and the CDN processing method is applied to an electronic device. As shown in FIG. 3, the CDN processing method includes the following steps. The detection end detects failure rates (x1, x2, . . . , xn) corresponding to n number of CDN nodes from different manufacturers. The detection failure rate is calculated as mentioned in the method embodiments in FIG. 1, which will thus not be particularly defined herein. Next, whether the minimum failure rate in the failure rates corresponding to the n CDN nodes is greater than a threshold th1, i.e., whether Min (x1, x2, . . . , xn) is greater than the threshold th1, is determined. If yes, whether the detection end is faulty is determined through a predetermined method. When the detection end is faulty, the threshold th1 is not updated, and when the detection end is not faulty, the threshold th1 is updated. When Min (x1, x2, . . . , xn) is not greater than the threshold th1, whether the detection end is faulty is further determined. When the detection end is faulty, the threshold th1 is updated, and when the detection end is not faulty, the threshold th1 is not updated. It should be appreciated that, ways for updating the threshold may refer to that mentioned in the method embodiments as illustrated in FIG. 1, and thus will not be particularly defined herein.

The present disclosure further provides in some embodiments a CDN processing device.

Figure 4:
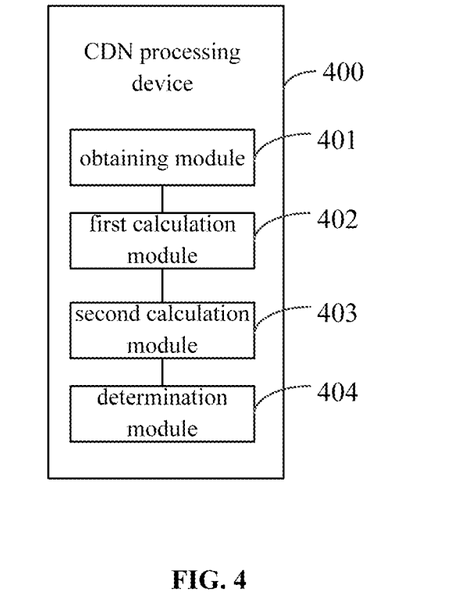
FIG. 4 is a schematic view showing a CDN processing device according to one embodiment of the present disclosure.

As shown in FIG. 4, which is a block diagram of the CDN processing device according to one embodiment of the present disclosure, the CDN processing device 400 includes: an obtaining module 401 configured to obtain response data from at least one CDN node in response to a network request from a detection end, the response data including information indicating that the network request is successful or failed; a first calculation module 402 configured to calculate the quantity of detection successes and the quantity of detection failures of the detection end corresponding to the at least one CDN node in accordance with the response data; a second calculation module 403 configured to calculate a detection failure rate of the detection end in accordance with the quantity of detection successes and the quantity of detection failures; and a determination module 404 configured to compare at least one of the detection failure rate or the quantity of detection failures with a target threshold, and determine whether the detection end is faulty in accordance with a comparison result.

In a possible embodiment of the present disclosure, the quantity of detection ends is N, N is an integer greater than 1, the detection failure rate is a detection failure rate corresponding to a target detection end, and the target detection end is any of the N detection ends. The determination module 404 is further configured to: obtain a detection failure rate of the target detection end corresponding to each CDN node in the at least one CDN nodes, each detection end in the N detection ends being configured to transmit a predetermined quantity of network requests, each network request corresponding to respond data transmitted by the at least one CDN node; obtain a minimum failure rate in the detection failure rates corresponding to the at least one CDN node; and in the case that the minimum failure rate is greater than a first target threshold, determine that the target detection end is faulty.

In a possible embodiment of the present disclosure, the quantity of detection failures corresponding to the target detection end is a target quantity of detection failures. The determination module 404 is further configured to: in the case that the minimum failure rate is smaller than or equal to the first target threshold, obtain a total quantity of detection failures of the N detection ends corresponding to the at least one CDN node in accordance with the response data; obtain a first ratio of the target quantity of detection failures to the total quantity of detection failures; in the case that the first ratio is greater than a second target threshold, obtain a target detection failure rate corresponding to a target CDN node, the target CDN node being any of the at least one CDN node; and in the case that the target detection failure rate is greater than a third target threshold, determine that the target detection end is faulty.

In a possible embodiment of the present disclosure, the CDN processing device 400 further includes a first updating module configured to, in the case that the target detection end is not faulty through a predetermined detection method, update the third target threshold or the first target threshold. The updated third target threshold is compared with the target detection failure rate subsequently, and the updated first target threshold is compared with the minimum failure rate subsequently.

In a possible embodiment of the present disclosure, the CDN processing device 400 further includes a second updating module configured to, in the case that the first ratio is smaller than or equal to the second target threshold and the target detection end is faulty through a predetermined detection method, update the second target threshold. The updated second target threshold is compared with the first ratio subsequently.

In a possible embodiment of the present disclosure, the CDN processing device 400 further includes a third updating module configured to, in the case that the target detection end is not faulty through a predetermined detection method, update the first target threshold. The updated first target threshold is compared with the minimum failure rate subsequently.

In a possible embodiment of the present disclosure, the CDN processing device 400 further includes a processing module configured to, in the case that the detection end is determined to be faulty in accordance with the comparison result, discard or repair the faulty detection end.

It should be appreciated that, the CDN processing device 400 in the embodiments of the present disclosure is capable of implementing the above-mentioned CDN processing method to achieve at least all the above-mentioned technical effects, which will not be particularly defined herein.

The collection, storage and usage of personal information involved in the embodiments of the present disclosure comply with relevant laws and regulations, and do not violate the principle of the public order.

The present disclosure further provides in some embodiments an electronic device, a computer-readable storage medium and a computer program product.

Figure 5:
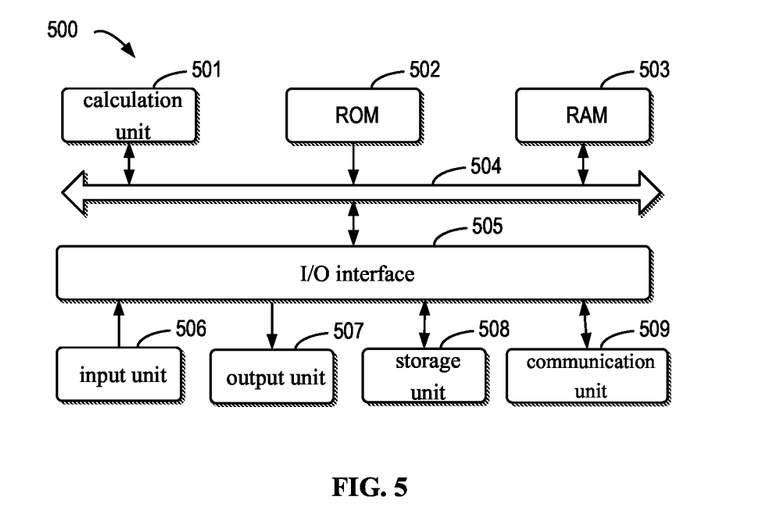
FIG. 5 is a block diagram of an electronic device for implementing the CDN processing method according to one embodiment of the present disclosure.

FIG. 5 is a schematic block diagram of an exemplary electronic device 500 in which embodiments of the present disclosure may be implemented. The electronic device is intended to represent all kinds of digital computers, such as a laptop computer, a desktop computer, a work station, a personal digital assistant, a server, a blade server, a main frame or other suitable computers. The electronic device may also represent all kinds of mobile devices, such as a personal digital assistant, a cell phone, a smart phone, a wearable device and other similar computing devices. The components shown here, their connections and relationships, and their functions, are meant to be exemplary only, and are not meant to limit implementations of the present disclosure described and/or claimed herein.

As shown in FIG. 5, the electronic device 500 includes a computing unit 501 configured to execute various processings in accordance with computer programs stored in a Read Only Memory (ROM) 502 or computer programs loaded into a Random Access Memory (RAM) 503 via a storage unit 508. Various programs and data desired for the operation of the electronic device 500 may also be stored in the RAM 503. The computing unit 501, the ROM 502 and the RAM 503 may be connected to each other via a bus 504. In addition, an input/output (I/O) interface 505 may also be connected to the bus 504.

Multiple components in the electronic device 500 are connected to the I/O interface 505. The multiple components include: an input unit 505, e.g., a keyboard, a mouse and the like; an output unit 505, e.g., a variety of displays, loudspeakers, and the like; a storage unit 508, e.g., a magnetic disk, an optic disk and the like; and a communication unit 509, e.g., a network card, a modem, a wireless transceiver, and the like. The communication unit 509 allows the electronic device 500 to exchange information/data with other devices through a computer network and/or other telecommunication networks, such as the Internet.

The computing unit 501 may be any general purpose and/or special purpose processing components having a processing and computing capability. Some examples of the computing unit 501 include, but are not limited to: a central processing unit (CPU), a graphic processing unit (GPU), various special purpose artificial intelligence (AI) computing chips, various computing units running a machine learning model algorithm, a digital signal processor (DSP), and any suitable processor, controller, microcontroller, etc. The computing unit 501 carries out the aforementioned methods and processes, e.g., the CDN processing method. For example, in some embodiments of the present disclosure, the CDN processing method may be implemented as a computer software program tangibly embodied in a machine readable medium such as the storage unit 508. In some embodiments of the present disclosure, all or a part of the computer program may be loaded and/or installed on the electronic device 500 through the ROM 502 and/or the communication unit 509. When the computer program is loaded into the RAM 503 and executed by the computing unit 501, one or more steps of the foregoing CDN processing method may be implemented. Optionally, in some other embodiments of the present disclosure, the computing unit 501 may be configured in any other suitable manner (e.g., by means of firmware) to implement the CDN processing method.

Various implementations of the aforementioned systems and techniques may be implemented in a digital electronic circuit system, an integrated circuit system, a field-programmable gate array (FPGA), an application specific integrated circuit (ASIC), an application specific standard product (ASSP), a system on a chip (SOC), a complex programmable logic device (CPLD), computer hardware, firmware, software, and/or a combination thereof. The various implementations may include an implementation in form of one or more computer programs. The one or more computer programs may be executed and/or interpreted on a programmable system including at least one programmable processor. The programmable processor may be a special purpose or general purpose programmable processor, may receive data and instructions from a storage system, at least one input device and at least one output device, and may transmit data and instructions to the storage system, the at least one input device and the at least one output device.

Program codes for implementing the methods of the present disclosure may be written in one programming language or any combination of multiple programming languages. These program codes may be provided to a processor or controller of a general purpose computer, a special purpose computer, or other programmable data processing device, such that the functions/operations specified in the flow diagram and/or block diagram are implemented when the program codes are executed by the processor or controller. The program codes may be run entirely on a machine, run partially on the machine, run partially on the machine and partially on a remote machine as a standalone software package, or run entirely on the remote machine or server.

In the context of the present disclosure, the machine readable medium may be a tangible medium, and may include or store a program used by an instruction execution system, device or apparatus, or a program used in conjunction with the instruction execution system, device or apparatus. The machine readable medium may be a machine readable signal medium or a machine readable storage medium. The machine readable medium includes, but is not limited to: an electronic, magnetic, optical, electromagnetic, infrared, or semiconductor system, device or apparatus, or any suitable combination thereof. A more specific example of the machine readable storage medium includes: an electrical connection based on one or more wires, a portable computer disk, a hard disk, a random access memory (RAM), a read only memory (ROM), an erasable programmable read only memory (EPROM or flash memory), an optic fiber, a portable compact disc read only memory (CD-ROM), an optical storage device, a magnetic storage device, or any suitable combination thereof.

To facilitate user interaction, the system and technique described herein may be implemented on a computer. The computer is provided with a display device (for example, a cathode ray tube (CRT) or liquid crystal display (LCD) monitor) for displaying information to a user, a keyboard and a pointing device (for example, a mouse or a track ball). The user may provide an input to the computer through the keyboard and the pointing device. Other kinds of devices may be provided for user interaction, for example, a feedback provided to the user may be any manner of sensory feedback (e.g., visual feedback, auditory feedback, or tactile feedback); and input from the user may be received by any means (including sound input, voice input, or tactile input).

The system and technique described herein may be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the system and technique), or any combination of such backend, middleware, or front-end components. The components of the system can be interconnected by any form or medium of digital data communication (e.g., a communication network). Examples of communication networks include a local area network (LAN), a wide area network (WAN) and the Internet.

The computer system can include a client and a server. The client and server are generally remote from each other and typically interact through a communication network. The relationship of client and server arises by virtue of computer programs running on respective computers and having a client-server relationship to each other. The server may be a cloud server, a server of a distributed system, or a server combined with blockchain.

It should be appreciated that, all forms of processes shown above may be used, and steps thereof may be reordered, added or deleted. For example, as long as expected results of the technical solutions of the present disclosure can be achieved, steps set forth in the present disclosure may be performed in parallel, performed sequentially, or performed in a different order, and there is no limitation in this regard.

The foregoing specific implementations constitute no limitation on the scope of the present disclosure. It is appreciated by those skilled in the art, various modifications, combinations, sub-combinations and replacements may be made according to design requirements and other factors. Any modifications, equivalent replacements and improvements made without deviating from the spirit and principle of the present disclosure shall be deemed as falling within the scope of the present disclosure.

What is claimed is:

1. A Content Delivery Network (CDN) processing method performed by an electronic device, the CDN processing method comprising:
    obtaining response data from at least one CDN node in response to a network request from a detection end, the response data comprising information indicating that the network request is successful or failed;
    calculating a quantity of detection successes and a quantity of detection failures of the detection end corresponding to the at least one CDN node in accordance with the response data;
    calculating a detection failure rate of the detection end in accordance with the quantity of detection successes and the quantity of detection failures; and
    comparing at least one of the detection failure rate or the quantity of detection failures with a target threshold, and determining whether the detection end is faulty in accordance with a comparison result,
    wherein the detection end is a virtual node in a third-party detection system for simulating a request end, and the detection end as the virtual node is different from the electronic device and the at least one CDN node.

2. The CDN processing method according to claim 1, wherein a quantity of detection ends is N, N is an integer greater than 1, the detection failure rate is a detection failure rate corresponding to a target detection end, and the target detection end is any of the N detection ends,
    wherein comparing the at least one of the detection failure rate or the quantity of detection failures with the target threshold and determining whether the detection end is faulty in accordance with the comparison result comprises:
    obtaining a detection failure rate of the target detection end corresponding to each CDN node in the at least one CDN nodes, each detection end in the N detection ends being configured to transmit a predetermined quantity of network requests, each network request of the predetermined quantity of network requests corresponding to respond data transmitted by the at least one CDN node;
    obtaining a minimum failure rate in the detection failure rates corresponding to the at least one CDN node; and
    in the case that the minimum failure rate is greater than a first target threshold, determining that the target detection end is faulty.

3. The CDN processing method according to claim 2, wherein the quantity of detection failures corresponding to the target detection end is a target quantity of detection failures, and wherein the CDN processing method further comprises:
    in the case that the minimum failure rate is smaller than or equal to the first target threshold, obtaining a total quantity of detection failures of the N detection ends corresponding to the at least one CDN node in accordance with the response data;
    obtaining a first ratio of the target quantity of detection failures to the total quantity of detection failures;
    in the case that the first ratio is greater than a second target threshold, obtaining a target detection failure rate corresponding to a target CDN node, the target CDN node being any of the at least one CDN node; and
    in the case that the target detection failure rate is greater than a third target threshold, determining that the target detection end is faulty.

4. The CDN processing method according to claim 3, wherein subsequent to determining that the target detection end is faulty in the case that the target detection failure rate is greater than the third target threshold, the CDN processing method further comprises:
    in the case that the target detection end is not faulty through a predetermined detection method, updating the third target threshold or the first target threshold,
    wherein the updated third target threshold is compared with the target detection failure rate, and the updated first target threshold is compared with the minimum failure rate.

5. The CDN processing method according to claim 3, wherein subsequent to obtaining the first ratio of the target quantity of detection failures to the total quantity of detection failures, the CDN processing method further comprises:
    in the case that the first ratio is smaller than or equal to the second target threshold and the target detection end is faulty through a predetermined detection method, updating the second target threshold, wherein the updated second target threshold is compared with the first ratio.

6. The CDN processing method according to claim 2, wherein in the case that the minimum failure rate is greater than the first target threshold, subsequent to determining that the target detection end is faulty, the CDN processing method further comprises:

in the case that the target detection end is not faulty through a predetermined detection method, updating the first target threshold, wherein the updated first target threshold is compared with the minimum failure rate.

7. The CDN processing method according to claim 1, wherein subsequent to determining whether the detection end is faulty in accordance with the comparison result, the CDN processing method further comprises:
in the case that the detection end is determined to be faulty in accordance with the comparison result, discarding or repairing the faulty detection end.

8. An electronic device, comprising at least one processor, and a memory in communication with the at least one processor, wherein the memory is configured to store therein at least one instruction to be executed by the at least one processor, and the at least one instruction is executed by the at least one processor so as to implement a Content Delivery Network (CDN) processing method performed by the electronic device, the CDN processing method comprising:
obtaining response data from at least one CDN node in response to a network request from a detection end, the response data comprising information indicating that the network request is successful or failed;
calculating a quantity of detection successes and a quantity of detection failures of the detection end corresponding to the at least one CDN node in accordance with the response data;
calculating a detection failure rate of the detection end in accordance with the quantity of detection successes and the quantity of detection failures; and
comparing at least one of the detection failure rate or the quantity of detection failures with a target threshold, and determining whether the detection end is faulty in accordance with a comparison result,
wherein the detection end is a virtual node in a third-party detection system for simulating a request end, and the detection end as the virtual node is different from the electronic device and the at least one CDN node.

9. The electronic device according to claim 8, wherein the quantity of detection ends is N, N is an integer greater than 1, the detection failure rate is a detection failure rate corresponding to a target detection end, and the target detection end is any of the N detection ends,
wherein comparing the at least one of the detection failure rate or the quantity of detection failures with the target threshold and determining whether the detection end is faulty in accordance with the comparison result comprises:
obtaining a detection failure rate of the target detection end corresponding to each CDN node in the at least one CDN nodes, each detection end in the N detection ends being configured to transmit a predetermined quantity of network requests, each network request of the predetermined quantity of network requests corresponding to respond data transmitted by the at least one CDN node;
obtaining a minimum failure rate in the detection failure rates corresponding to the at least one CDN node; and
in the case that the minimum failure rate is greater than a first target threshold, determining that the target detection end is faulty.

10. The electronic device according to claim 9, wherein the quantity of detection failures corresponding to the target detection end is a target quantity of detection failures, and wherein the CDN processing method further comprises:
in the case that the minimum failure rate is smaller than or equal to the first target threshold, obtaining a total quantity of detection failures of the N detection ends corresponding to the at least one CDN node in accordance with the response data;
obtaining a first ratio of the target quantity of detection failures to the total quantity of detection failures;
in the case that the first ratio is greater than a second target threshold, obtaining a target detection failure rate corresponding to a target CDN node, the target CDN node being any of the at least one CDN node; and
in the case that the target detection failure rate is greater than a third target threshold, determining that the target detection end is faulty.

11. The electronic device according to claim 10, wherein subsequent to determining that the target detection end is faulty in the case that the target detection failure rate is greater than the third target threshold, the CDN processing method further comprises:
in the case that the target detection end is not faulty through a predetermined detection method, updating the third target threshold or the first target threshold, wherein the updated third target threshold is compared with the target detection failure rate, and the updated first target threshold is compared with the minimum failure rate.

12. The electronic device according to claim 10, wherein subsequent to obtaining the first ratio of the target quantity of detection failures to the total quantity of detection failures, the CDN processing method further comprises:
in the case that the first ratio is smaller than or equal to the second target threshold and the target detection end is faulty through a predetermined detection method, updating the second target threshold, wherein the updated second target threshold is compared with the first ratio.

13. The electronic device according to claim 9, wherein in the case that the minimum failure rate is greater than the first target threshold, subsequent to determining that the target detection end is faulty, the CDN processing method further comprises:
in the case that the target detection end is not faulty through a predetermined detection method, updating the first target threshold, wherein the updated first target threshold is compared with the minimum failure rate.

14. The electronic device according to claim 8, wherein subsequent to determining whether the detection end is faulty in accordance with the comparison result, the CDN processing method further comprises:
in the case that the detection end is determined to be faulty in accordance with the comparison result, discarding or repairing the faulty detection end.

15. A non-transitory computer-readable storage medium storing therein at least one computer instruction, wherein the at least one computer instruction is executed by a processor of an electronic device, so as to implement a Content Delivery Network (CDN) processing method performed by the electronic device, the CDN processing method comprising:
obtaining response data from at least one CDN node in response to a network request from a detection end, the response data comprising information indicating that the network request is successful or failed;

calculating a quantity of detection successes and a quantity of detection failures of the detection end corresponding to the at least one CDN node in accordance with the response data;

calculating a detection failure rate of the detection end in accordance with the quantity of detection successes and the quantity of detection failures; and comparing at least one of the detection failure rate or the quantity of detection failures with a target threshold, and determining whether the detection end is faulty in accordance with a comparison result, wherein the detection end is a virtual node in a third-party detection system for simulating a request end, and the detection end as the virtual node is different from the electronic device and the at least one CDN node.

16. The non-transitory computer-readable storage medium according to claim 15, wherein the quantity of detection ends is N, N is an integer greater than 1, the detection failure rate is a detection failure rate corresponding to a target detection end, and the target detection end is any of the N detection ends, wherein comparing the at least one of the detection failure rate or the quantity of detection failures with the target threshold and determining whether the detection end is faulty in accordance with the comparison result comprises:

obtaining a detection failure rate of the target detection end corresponding to each CDN node in the at least one CDN nodes, each detection end in the N detection ends being configured to transmit a predetermined quantity of network requests, each network request of the predetermined quantity of network requests corresponding to respond data transmitted by the at least one CDN node;

obtaining a minimum failure rate in the detection failure rates corresponding to the at least one CDN node; and in the case that the minimum failure rate is greater than a first target threshold, determining that the target detection end is faulty.

17. The non-transitory computer-readable storage medium according to claim 16, wherein the quantity of detection failures corresponding to the target detection end is a target quantity of detection failures, and wherein the CDN processing method further comprises:

in the case that the minimum failure rate is smaller than or equal to the first target threshold, obtaining a total quantity of detection failures of the N detection ends corresponding to the at least one CDN node in accordance with the response data;

obtaining a first ratio of the target quantity of detection failures to the total quantity of detection failures;

in the case that the first ratio is greater than a second target threshold, obtaining a target detection failure rate corresponding to a target CDN node, the target CDN node being any of the at least one CDN node; and in the case that the target detection failure rate is greater than a third target threshold, determining that the target detection end is faulty.

18. The non-transitory computer-readable storage medium according to claim 17, wherein subsequent to determining that the target detection end is faulty in the case that the target detection failure rate is greater than the third target threshold, the CDN processing method further comprises:

in the case that the target detection end is not faulty through a predetermined detection method, updating the third target threshold or the first target threshold, wherein the updated third target threshold is compared with the target detection failure rate, and the updated first target threshold is compared with the minimum failure rate.

19. The non-transitory computer-readable storage medium according to claim 17, wherein subsequent to obtaining the first ratio of the target quantity of detection failures to the total quantity of detection failures, the CDN processing method further comprises:

in the case that the first ratio is smaller than or equal to the second target threshold and the target detection end is faulty through a predetermined detection method, updating the second target threshold, wherein the updated second target threshold is compared with the first ratio.

20. The non-transitory computer-readable storage medium according to claim 16, wherein in the case that the minimum failure rate is greater than the first target threshold, subsequent to determining that the target detection end is faulty, the CDN processing method further comprises:

in the case that the target detection end is not faulty through a predetermined detection method, updating the first target threshold, wherein the updated first target threshold is compared with the minimum failure rate subsequently, wherein subsequent to determining whether the detection end is faulty in accordance with the comparison result, the CDN processing method further comprises:

in the case that the detection end is determined to be faulty in accordance with the comparison result, discarding or repairing the faulty detection end.

* * * * *